United States Patent Office 2,971,799
Patented Feb. 14, 1961

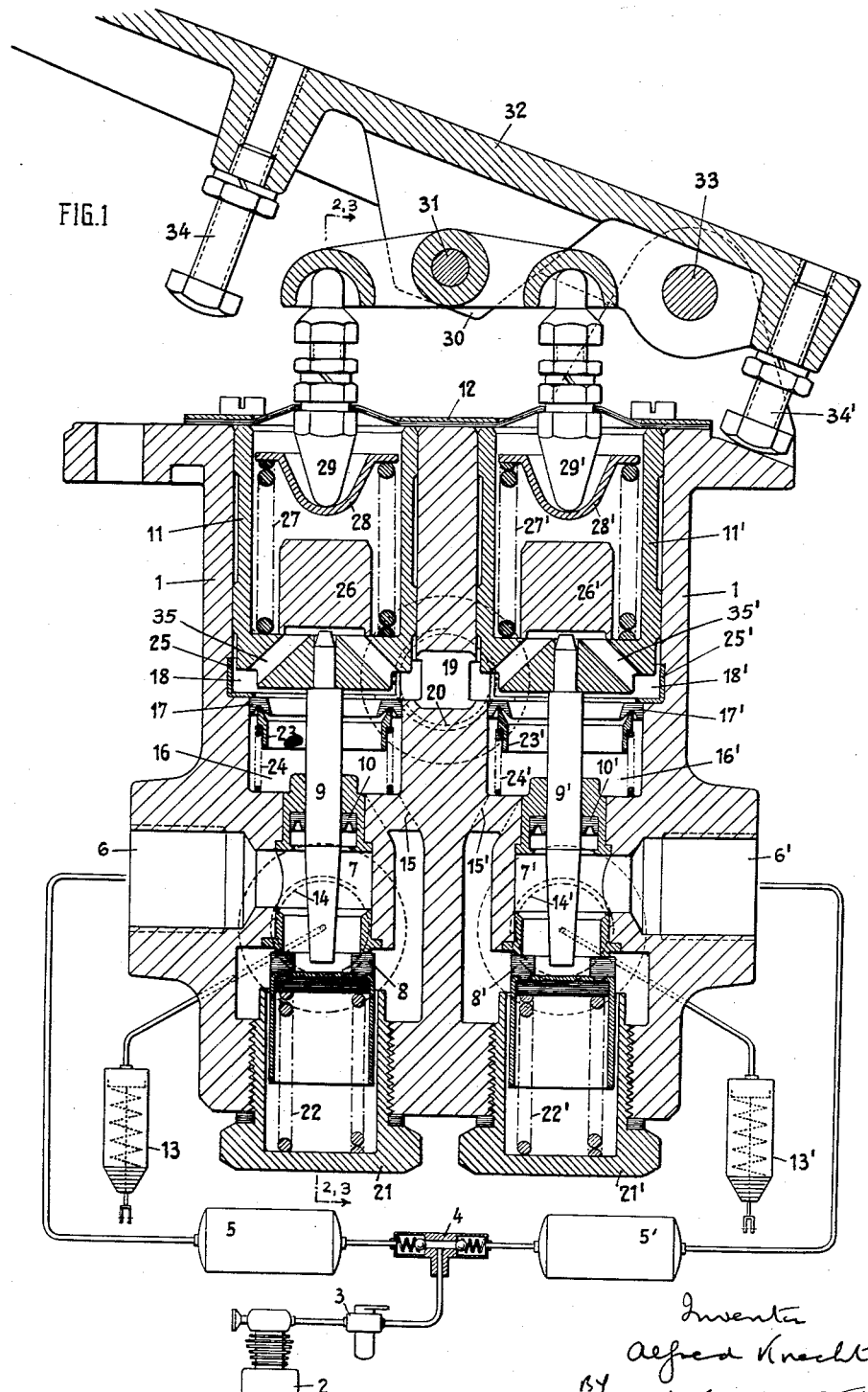

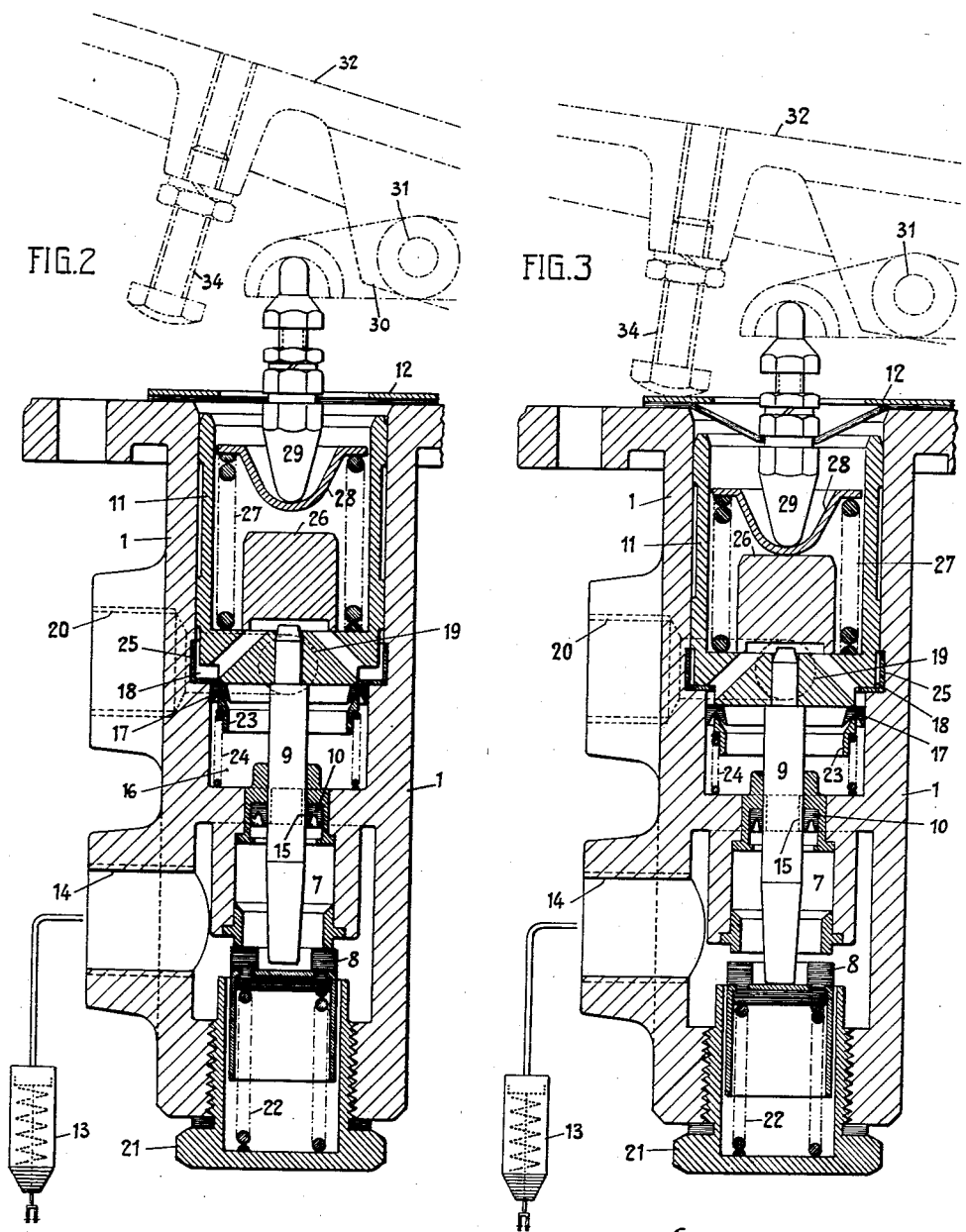

2,971,799

BRAKE VALVE

Alfred Knecht, St. Aubin, Switzerland, assignor to BEKA St. Aubin A.G., St. Aubin, Switzerland, a firm Filed Mar. 11, 1958, Ser. No. 720,769

Claims priority, application Switzerland Mar. 13, 1957

7 Claims. (Cl. 303—54)

This invention relates to a brake valve in compressed air brakes of motor vehicles, especially motor lorries. This brake valve, which is usually arranged for operating by a foot plate, has a venting valve and a compressed air feed valve which is operable by way of the valve closing body of the venting valve, the valve seat of the closed venting valve being movable by means of its closing body against an elastic load in the direction of opening of the feed valve, and a stop being provided for the purpose of limiting the movement of said seat in the direction of the opening movement of the closing body.

Such brake valves must not only be operationally dependable but must also give progressive braking adapted to fine gradation and operate with the shortest possible braking and releasing times. For the purposes of increasing operational dependability, known brake valves operate with two separate pneumatic circuits. For reasons of better gradation and shorter braking and releasing times they are provided with small and larger valve cross-sections and corresponding movable valve parts. Nevertheless, these brake valves do not adequately give the driver of the vehicle the desired feeling of communication with his vehicle and of individual mastery of the latter during braking. This is due particularly to the fact that in hitherto known brake valves of this kind the feed valve must be opened against the feed pressure prevailing at any given time and thus premature fatigue of the driver of the vehicle can occur on repeated braking in a rapid sequence or in the case of continuous braking, while on increasing the brake pressure or in the case of decreasing feed pressure the operating resistance decreases, which is psychologically inconsistent.

With the invention these disadvantages are to be avoided and further improvements achieved, which will be individually mentioned in detail. According to the invention the closing body of the feed valve is subject to an elastic load, which closes the valve against the feed pressure and which at maximum feed pressure is still sufficient to close the valve, in consequence of which structure the operating resistance becomes larger on the one hand upon increase of the braking pressure and on the other hand upon decrease of the feed pressure.

One exemplified embodiment of the brake valve according to the invention is illustrated in the accompanying drawing, in which:

Fig. 1 is an axial section of a foot plate twin brake valve for two separate pneumatic braking circuits, and Figs. 2 and 3 are respectively axial sections of one of the twin valve pair in the brake holding position and in the stop position with the venting valve closed and the feed valve open.

In the twin brake valve pair illustrated, corresponding structural parts are denoted by like reference numerals, with the addition of an apostrophe in each case for the brake valve situated on the right. The following description is mainly limited to the brake valve situated on the left.

The two brake valves forming the twin brake valve pair accommodated in the housing 1 each belong to a separate brake system, which apart from the valve operation is completely independent of the other. The compressed air produced by the compressor 2 flows through the pressure regulator 3 to the double non-return valve 4 and is distributed over the compressed air reservoirs 5 and 5', from which the compressed air passes through the connections 6 and 6' respectively to the feed pressure chambers 7 and 7' respectively. The feed pressure chamber 7 is on the one hand sealed off by the closing body 8 of the feed valve and on the other hand by a piston stem 9 projecting into the chamber 7 and a packing 10, which seals off the passage of said stem into the chamber 7. The pressure acting in the chamber 7 on the piston stem 9 holds the valve closing piston 11 of the venting valve 11, 17 in its initial position shown in Fig. 1, against the housing cover plate 12. The brake cylinder 13 thus pneumatically communicates with atmosphere through the connection 14, the passage 15 by-passing the packing 10, the reaction chamber 16, the venting valve 11, 17, the venting chamber 18, the passage 19 and the connection 20 (Fig. 2). The closing body 8 of the feed valve is guided in a closure plug 21 and loaded by a compression spring 22 which at maximum feed pressure in the chamber 7 is still just sufficient to close the feed valve tightly. Thus to open the feed valve only a small operating force is required which must however be correspondingly increased in the case of reduced feed pressure or increased braking pressure. Besides, the feed valve 8 has a compressed air passage being arranged to let the air flow out in outward direction.

The valve seat 17 of the venting valve is pressed by a coil spring 24 by means of a holder ring 23 in the direction of the opening movement of the closing piston 11 against an annular stop 25. In the piston 11 is disposed a supporting stop 26 which limits the compression range of a regulating spring 27 supported in the piston 11. A weighbeam 30 is supported on the regulating spring 27 by way of a spring disc 28 and a plunger 29 adjustable as to length, and is mounted rockably on the underside of the foot plate 32 by means of a pivot 31. The foot plate 32 is mounted on the valve housing 1 by means of a pivot 33 so as to be rockable in the upward and downward direction and its inclination to the housing can be varied by means of stop screws 34 and 34' of adjustable effective length and of the plungers 29 and 29'.

To operate the brakes, that is to feed the brake cylinders 13 and 13' with compressed air, the foot plate 32 is depressed by an operating force which is distributed by the weighbeam 30 over the two plungers 29 and 29' and moves the closing pistons 11 and 11' downward by way of the spring discs 28 and 28' and the regulating springs 27 and 27'. In these circumstances, the end face of the pistons 11 and 11' comes onto the valve seats 17 and 17' respectively and closes the venting valve. The pneumatic connection between the braking cylinders 13 and 13' respectively and atmosphere is thus interrupted.

If the pistons 11 and 11' are moved down further, the piston stems 9 and 9' come onto the closing bodies 8 and 8' respectively of the feed valve and open the latter against the overpressure action of the springs 22 and 22' respectively, which action is superior to the feed pressure. In the case of different feed pressures in the reservoirs 5 and 5' the opening resistance in the case of the valve 8 or 8' exposed to a lower feed pressure is greater than in the other and accordingly the operating force is distributed by means of the weighbeam 30 inversely proportionally to the two valves. The valve with the higher feed pressure is thus opened first and to a greater extent than the other. Compressed air now flows from the feed pressure chamber 7 in an outward direction through the feed valve by way of the connection 14 to the brake cylinder 13. At the same time compressed air passes through the passage 15 into the reaction chamber 16 and exerts a regulating resistance or reaction force on the valve seat 17 and the closing piston 11 of the venting valve. The other brake valve of the twin pair operates in similar manner, for which reason only the function of one valve is explained hereinafter.

In the so-called normal state of the brake holding position shown in Fig. 2, the closing piston 11 has again lifted to such an extent that the valve seat 17 bears against the annular stop 25, whereby approximately 35% of the abovementioned reaction force is taken by the annular stop and the brake holding force at the foot plate 32 consequently decreases by this amount. In the case of continuous braking operations, fatigue of the driver of the vehicle thus occurs must less rapidly.

On release of the brakes, the foot plate is relieved, the closing piston 11 is rapidly lifted off the valve seat by the overpressure in the reaction chamber 16 and the feed pressure acting on the piston stem 9, whereby the brake cylinder is vented. The venting speed is determined by the bores 35 and 35' provided in the bottom of the pistons 11 and 11' respectively.

If stop braking according to Fig. 3 is performed, the feed valve 8 is pushed open directly by means of the supporting stop 26 and the piston stem 9, whereby rapid braking is produced.

What I claim is:

1. Brake valve arrangement comprising in combination, a hollow valve body having an inlet for compressed air, a pressure outlet adapted to be connected to a brake cylinder, and a venting outlet; venting valve means movable in said valve body in a first direction for opening said venting outlet, and in an opposite second direction for closing said venting outlet, said venting valve means being urged by the pressure in said valve body to move in said first direction; valve seat means movably mounted in said valve body and being engaged by said venting valve means during movement of the same in said second direction whereby said venting outlet is first closed whereupon said valve seat means moves with said venting valve means in said second direction; means urging said valve seat means to move in said first direction; means for limiting movement of said valve seat means; feeding valve means movable in said valve body in one direction to a closed position for closing said pressure outlet, and in another opposite direction for connecting said inlet with said pressure outlet, the pressure in said valve body tending to move said feeding valve means in said other direction; biasing means for urging said feeding valve means in said one direction with a force sufficient to overcome the maximum pressure in the valve body and to hold said feeding valve means in said closed position; connecting means operatively connected to said venting valve means and engaging said feeding valve means during movement of said venting valve means with said valve seat means for moving said feeding valve means in said other direction out of said closed position when said venting valve means moves with said movable valve seat means after said venting outlet is closed; and operating means for moving said venting valve means in said second direction, whereby only a small force on said operating means is required for opening said feeding valve means in said other direction due to the action of the pressure in the valve body on said feeding valve means, and whereby the resistance against movement of said operating means increases upon increase of the brake pressure and upon decrease of the pressure of the compressed air supplied through said inlet so that the operating conditions are indicated to the operator.

2. Brake valve arrangement comprising in combination, a hollow valve body having an inlet for compressed air, a pressure outlet adapted to be connected to a brake cylinder, and a venting outlet; venting valve means movable in said valve body in a first direction for opening said venting outlet, and in an opposite second direction for closing said venting outlet, said venting valve means being urged by the pressure in said valve body to move in said first direction; valve seat means movably mounted in said valve body and being engaged by said venting valve means during movement of the same in said second direction whereby said venting outlet is first closed whereupon said valve seat means moves with said venting valve means in said second direction; spring means urging said valve seat means to move in said first direction; stop means in said valve body engaging said valve seat means to limit movement of the same, said valve seat means being moved away from said stop means by said venting valve means moving in said second direction; feeding valve means movable in said valve body in said first direction to a closed position for closing said pressure outlet, and in said second direction for connecting said inlet with said pressure outlet, the pressure in said valve body tending to move said feeding valve means in said second direction; biasing means for urging said feeding valve means in said first direction with a force sufficient to overcome the maximum pressure in the valve body and to hold said feeding valve means in said closed position; a connecting member secured to said venting valve means and engaging said feeding valve means during movement of said venting valve means with said valve seat means for moving said feeding valve means in said second direction out of said closed position when said venting valve means moves with said movable valve seat means after said venting outlet is closed; and operating means for moving said venting valve means in said second direction, whereby only a small force on said operating means is required for opening said feeding valve means in said second direction due to the action of the pressure in the valve body on said feeding valve means, and whereby the resistance against movement of said operating means increases upon increase of the brake pressure and upon decrease of the pressure of the compressed air supplied through said inlet so that the operating conditions are indicated to the operator.

3. A brake valve arrangement as set forth in claim 2, wherein said valve body is formed with a reaction chamber communicating with said venting outlet and being partly bounded by said venting valve means, and is further formed with a pressure chamber communicating with said inlet, and with an outlet chamber communicating with said pressure outlet, said feeding valve means in said closed position disconnecting said pressure chamber from said outlet chamber, and connecting said pressure chamber with said outlet chamber when said feeding valve means moves in said second direction, the pressure in said outlet chamber urging said feeding valve means to move in said first direction, said valve body being further formed with a passage connecting said outlet chamber with said reaction chamber so that the brake cylinder is vented through said passage when said venting valve means is moved in said first direction away from said valve seat means while said valve seat means is stopped by said stop means; and wherein said connecting member has a portion located in said pressure chamber so that the pressure acting on said connecting member urges said venting valve means to move in said first direction.

4. A brake arrangement as set forth in claim 3, wherein said feeding valve means is a piston having an end portion located in said outlet chamber, and wherein said valve body has a conduit communicating with said pressure chamber and opening in said outlet chamber opposite the end face of said end portion of said piston, whereby upon movement of said piston in said second direction, compressed air moves through said conduit and from the same in outward direction into said outlet chamber.

5. Brake valve arrangement comprising in combination, a hollow valve body having an inlet for compressed air, a pressure outlet adapted to be connected to a brake cylinder, and a venting outlet, said venting valve means being urged by the pressure in said valve body to move in said first direction; venting valve means movable in said valve body in a first direction for opening said venting outlet, and in an opposite second direction for closing said venting outlet; valve seat means movably mounted in said valve body and being engaged by said venting valve means during movement of the same in said second direction whereby said venting outlet is first closed whereupon said valve seat means moves with said venting valve means in said second direction; means urging said valve seat means to move in said first direction; means for limiting movement of said valve seat means; feeding valve means movable in said valve body in one direction to a closed position for closing said pressure outlet, and in another opposite direction for connecting said inlet with said pressure outlet, the pressure in said valve body tending to move said feeding valve means in said other direction; biasing means for urging said feeding valve means in said one direction with a force sufficient to overcome the maximum pressure in the valve body and to hold said feeding valve means in said closed position; connecting means operatively connected to said venting valve means and engaging said feeding valve means during movement of said venting valve means with said valve seat means for moving said feeding valve means in said other direction out of said closed position when said venting valve means moves with said movable valve seat means after said venting outlet is closed; and operating means for moving said venting valve means in said second direction, whereby only a small force on said operating means is required for opening said feeding valve means in said other direction due to the action of the pressure in the valve body on said feeding valve means, and whereby the resistance against movement of said operating means increases upon increase of the brake pressure and upon decrease of the pressure of the compressed air supplied through said inlet so that the operating conditions are indicated to the operator, said operating means including a spring acting on said venting valve means, an operating member acting on said spring so that said spring is partly compressed when said operating member moves said venting valve means in said second direction, and an abutment on said venting valve means engaged by said operating member when said spring is partly compressed so that the force of the operating member is directly transmitted to said venting valve means upon rapid operation of said operating member, whereas upon slow operation of said operating member the force is transmitted from said operating member through said spring to said venting valve means.

6. Brake valve arrangement comprising in combination, a hollow valve body having an inlet for compressed air, a pressure outlet adapted to be connected to a brake cylinder, and a venting outlet; venting valve means movable in said valve body in a first direction for opening said venting outlet, and in an opposite second direction for closing said venting outlet, said venting valve means being urged by the pressure in said valve body to move in said first direction; valve seat means movably mounted in said valve body and being engaged by said venting valve means during movement of the same in said second direction whereby said venting outlet is first closed whereupon said valve seat means moves with said venting valve means in said second direction; spring means urging said valve seat means to move in said first direction; stop means in said valve body engaging said valve seat means to limit movement of the same, said valve seat means being moved away from said stop means by said venting valve means moving in said second direction; feeding valve means movable in said valve body in said first direction to a closed position for closing said pressure outlet, and in said second direction for connecting said inlet with said pressure outlet, the pressure in said valve body tending to move said feeding valve means in said second direction; biasing means for urging said feeding valve means in said first direction with a force sufficient to overcome the maximum pressure in the valve body and to hold said feeding valve means in said closed position; a connecting member secured to said venting valve means and engaging said feeding valve means during movement of said venting valve means with said valve seat means for moving said feeding valve means in said second direction out of said closed position when said venting valve means moves with said movable valve seat means after said venting outlet is closed; and operating means for moving said venting valve means in said second direction, whereby only a small force on said operating means is required for opening said feeding valve means in said second direction due to the action of the pressure in the valve body on said feeding valve means, and whereby the resistance against movement of said operating means increases upon increase of the brake pressure and upon decrease of the pressure of the compressed air supplied through said inlet so that the operating conditions are indicated to the operator, said operating means including a spring acting on said venting valve means, an operating member acting on said spring so that said spring is partly compressed when said operating member moves said venting valves means in said second direction, and an abutment on said venting valve means engaged by said operating member when said spring is partly compressed so that the force of the operating member is directly transmitted to said venting valve means upon rapid operation of said operating member, whereas upon slow operation of said operating member the force is transmitted from said operating member through said spring to said venting valve means.

7. A brake valve arrangement as set forth in claim 6, wherein said operating means include a pivoted beam acting at one end on said operating member, and a foot pedal pivotally supporting said beam; and wherein the other end of said beam is adapted to act on a corresponding operating member of another corresponding brake valve arrangement.

References Cited in the file of this patent

UNITED STATES PATENTS

| | | |
|---|---|---|
| 1,791,901 | McIntyre | Feb. 10, 1931 |
| 1,874,297 | Ives | Aug. 30, 1932 |
| 2,493,442 | Casler | Jan. 3, 1950 |
| 2,680,654 | Edge et al. | June 8, 1954 |

FOREIGN PATENTS

| | | |
|---|---|---|
| 633,979 | France | Feb. 7, 1928 |

OTHER REFERENCES

BEKA, German application, Serial No. B30857, printed Oct. 31, 1956.